(12) United States Patent
Bruno et al.

(10) Patent No.: US 9,605,597 B2
(45) Date of Patent: *Mar. 28, 2017

(54) VARIABLE FREQUENCY DRIVE POWER RIDE THRU

(71) Applicant: SOLAR TURBINES INCORPORATED, San Diego, CA (US)

(72) Inventors: Rachel Bruno, San Diego, CA (US); Daniel Fingleton, San Diego, CA (US); Scott Hitoshi Kato, Rolling Hills Estates, CA (US)

(73) Assignee: Solar Turbines Incorporated, San Diego, CA (US)

( * ) Notice: Subject to any disclaimer, the term of this patent is extended or adjusted under 35 U.S.C. 154(b) by 784 days.

This patent is subject to a terminal disclaimer.

(21) Appl. No.: 13/917,148

(22) Filed: Jun. 13, 2013

(65) Prior Publication Data

US 2014/0366546 A1 Dec. 18, 2014

(51) Int. Cl.
| | |
|---|---|
| F02C 7/268 | (2006.01) |
| F02C 7/36 | (2006.01) |
| F02C 9/00 | (2006.01) |
| F01D 21/00 | (2006.01) |

(52) U.S. Cl.
CPC ............... *F02C 9/00* (2013.01); *F01D 21/00* (2013.01); *F02C 7/268* (2013.01); *F02C 7/36* (2013.01); *F05D 2270/061* (2013.01); *Y02E 20/14* (2013.01)

(58) Field of Classification Search
CPC .. F01D 21/00; F02C 7/268; F02C 7/36; F02C 7/22; F05D 2270/061; F05D 2260/98
See application file for complete search history.

(56) References Cited

U.S. PATENT DOCUMENTS

| | | | | |
|---|---|---|---|---|
| 2,617,253 | A * | 11/1952 | Fusner | F02C 7/26 60/39.091 |
| 3,998,052 | A | 12/1976 | Easter | |
| 6,281,595 | B1 * | 8/2001 | Sinha | F01D 15/10 290/40 A |
| 6,998,728 | B2 | 2/2006 | Gupta et al. | |
| 9,273,610 | B2 * | 3/2016 | Fingleton | H02J 7/00 |
| 2002/0175522 | A1 * | 11/2002 | Wacknov | H02P 9/04 290/52 |
| 2009/0301053 | A1 * | 12/2009 | Geiger | F01D 21/06 60/39.08 |

(Continued)

FOREIGN PATENT DOCUMENTS

| | | |
|---|---|---|
| DE | 102005003853 | 8/2006 |
| DE | 102008034163 | 1/2010 |

*Primary Examiner* — William H Rodriguez
*Assistant Examiner* — Thomas Burke
(74) *Attorney, Agent, or Firm* — Procopio, Cory, Hargreaves & Savitch, LLP

(57) ABSTRACT

A gas turbine engine includes a compressor, a combustor adjacent the compressor, a turbine adjacent the combustor, a shaft, a motor, a variable frequency drive, a stored energy source and a ride thru unit. The motor is coupled to the shaft. The variable frequency drive is electrically connected to the motor and to an AC power source. The ride thru unit electrically connects to the variable frequency drive, the AC power source and the stored energy source. The ride thru unit includes at least one DC to DC voltage converter.

20 Claims, 2 Drawing Sheets

(56) References Cited

U.S. PATENT DOCUMENTS

| | | | |
|---|---|---|---|
| 2010/0219779 A1* | 9/2010 | Bradbrook | F02C 3/113 |
| | | | 318/153 |
| 2010/0280733 A1 | 11/2010 | Jordan, Jr. et al. | |
| 2010/0283242 A1 | 11/2010 | Dooley et al. | |
| 2011/0138816 A1 | 6/2011 | Takeda et al. | |
| 2011/0217158 A1* | 9/2011 | Grissino | F01D 11/001 |
| | | | 415/115 |

* cited by examiner

VARIABLE FREQUENCY DRIVE POWER RIDE THRU

TECHNICAL FIELD

The present disclosure generally pertains to gas turbine engines, and is more particularly directed toward a gas turbine engine with a ride thru unit for a variable frequency drive.

BACKGROUND

Gas turbine engines include compressor, combustor, and turbine sections connected by one or more shafts. Shafts may deform or bow during cool down.

U.S. patent application No. 2009/0301053 to Peter Geiger discloses a gas turbine engine including at least one compressor, one combustion chamber, and at least one turbine including at least one rotor and at least one generator coupled to the at least one rotor is provided. The at least one turbine is coupled to the at least one compressor. Once the gas turbine is shut down, the at least one generator can be used as a motor in order to drive the at least one rotor for a predetermined time period following shutdown of the gas turbine and thereby effect a uniform cooling of the rotor.

The present disclosure is directed toward overcoming one or more of the problems discovered by the inventors.

SUMMARY OF THE DISCLOSURE

A gas turbine engine is disclosed. The gas turbine engine includes a compressor, a combustor adjacent the compressor, a turbine adjacent the combustor, a shaft, a motor, a variable frequency drive, a stored energy source and a ride thru unit. The compressor includes a compressor rotor assembly including a plurality of compressor disk assemblies. The turbine includes a turbine rotor assembly including a plurality of turbine disk assemblies. The shaft is coupled to the compressor rotor assembly and at least one turbine disk assembly. The motor is coupled to the shaft. The variable frequency drive is electrically connected to the motor and to an AC power source. The variable frequency drive includes an AC to DC voltage converter and a DC to AC voltage converter. The ride thru unit electrically connects to the variable frequency drive, the AC power source and the stored energy source. The ride thru unit includes at least one DC to DC voltage converter.

A method for cooling down a shaft for a gas turbine engine with a slow roll is also disclosed. The method includes turning a shaft for a gas turbine engine with a motor connected to a variable frequency drive after shutting down the gas turbine engine. The method also includes monitoring the alternating current power of an alternating current power source for the variable frequency drive with a ride thru unit while turning the shaft with the motor. The method further includes providing power from a stored energy source to the variable frequency drive through the ride thru unit when an interruption or loss of the alternating current power occurs.

DETAILED DESCRIPTION

The systems and methods disclosed herein include a gas turbine engine including a slow roll system. In embodiments, the slow roll system includes a motor, a variable frequency drive, a ride thru unit, and a stored energy source. The motor is coupled to the shaft of the gas turbine engine; the variable frequency drive is electrically connected to the motor, an AC power source, and the ride thru unit; and the ride thru unit is electrically connected to the variable frequency drive, the stored energy source, and the AC power source. The ride thru unit provides power to the variable frequency drive from the stored energy source. A slow roll system with a ride thru unit prevents a loss of power to the slow roll system during a slow roll operation while the shaft is cooling down after shut down of the gas turbine engine. Preventing a loss of power will keep the shaft turning while it is cooling down which may prevent bowing or warpage to the shaft during its cool down period.

A ride thru unit may be similarly connected to a lube oil system or a fuel system and may be used to prevent the loss of power during operation of the gas turbine engine to the lube oil system and the fuel system respectively. Preventing the loss of power to the lube oil system or the fuel system may avoid a shutdown of the gas turbine engine, which may be caused by a loss of power to the variable frequency drive connected to either the lube oil system or the fuel system.

Figure 1:
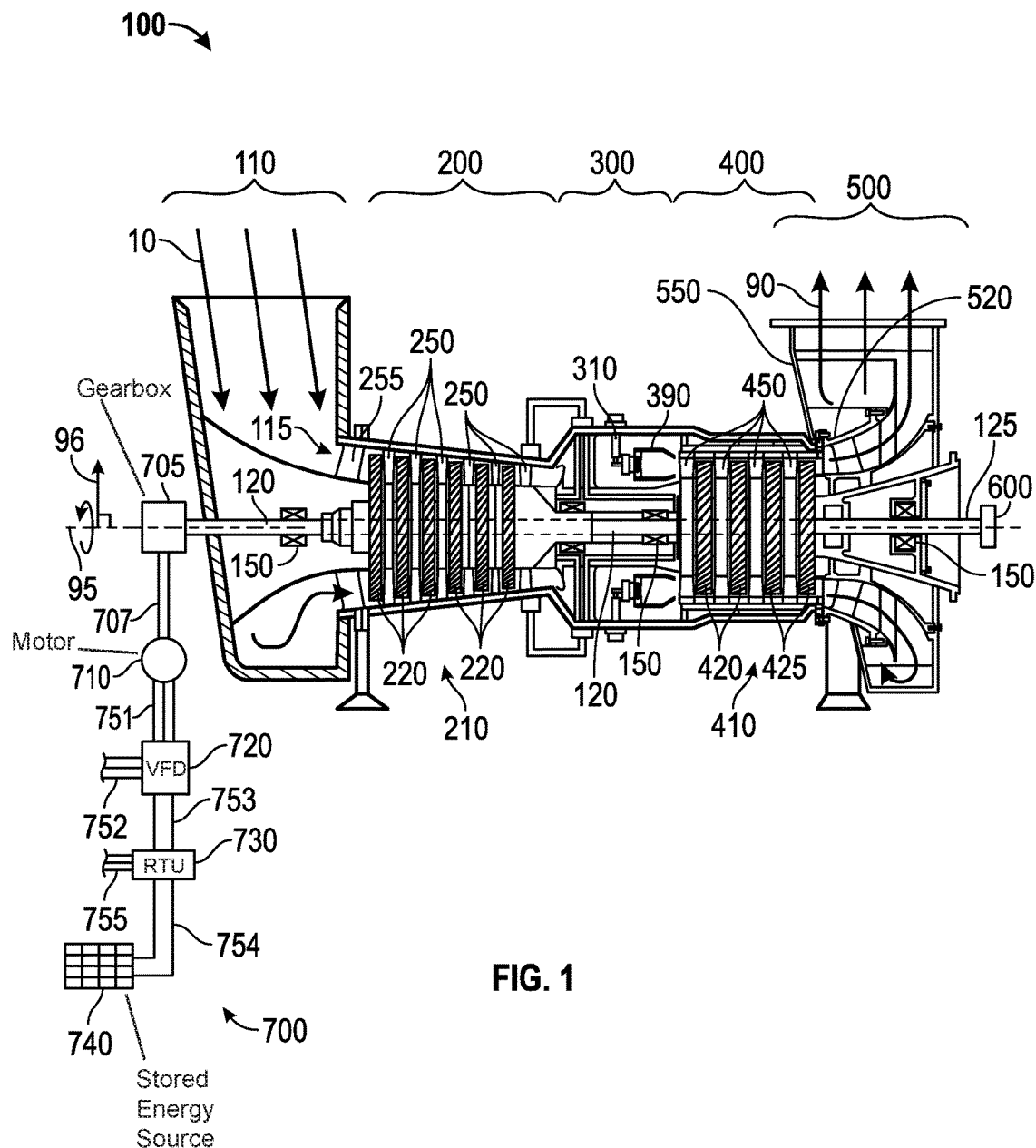
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. Also, the disclosure may reference a forward and an aft direction. Generally, all references to "forward" and "aft" are associated with the flow direction of primary air (i.e., air used in the combustion process), unless specified otherwise. For example, forward is "upstream" relative to primary air flow, and aft is "downstream" relative to primary air flow.

In addition, the disclosure may generally reference a center axis 95 of rotation of the gas turbine engine, which may be generally defined by the longitudinal axis of its shaft or shafts (supported by a plurality of bearing assemblies 150). The center axis 95 may be common to or shared with various other engine concentric components. All references to radial, axial, and circumferential directions and measures refer to center axis 95, unless specified otherwise, and terms such as "inner" and "outer" generally indicate a lesser or greater radial distance from, wherein a radial 96 may be in any direction perpendicular and radiating outward from center axis 95.

A gas turbine engine 100 includes an inlet 110, a compressor 200, a combustor 300, a turbine 400, an exhaust 500, and a power output coupling 600.

The compressor 200 includes a compressor rotor assembly 210, compressor stationary vanes ("stators") 250, and inlet guide vanes 255. As illustrated, the compressor rotor assembly 210 is an axial flow rotor assembly. The compressor rotor assembly 210 includes one or more compressor disk assemblies 220. Each compressor disk assembly 220 includes a compressor rotor disk that is circumferentially populated with compressor rotor blades. Stators 250 axially follow each of the compressor disk assemblies 220. Each compressor disk assembly 220 paired with the adjacent stators 250 that follow the compressor disk assembly 220 is considered a compressor stage. Compressor 200 includes multiple compressor stages. Inlet guide vanes 255 axially precede the compressor stages.

The combustor 300 includes one or more fuel injectors 310 and includes one or more combustion chambers 390. The fuel injectors 310 may be annularly arranged about center axis 95.

The turbine 400 includes a turbine rotor assembly 410, and turbine nozzles 450. As illustrated, the turbine rotor assembly 410 is an axial flow rotor assembly. The turbine rotor assembly 410 may include one or more gas producer turbine disk assemblies 420 and one or more power turbine disk assemblies 425. Gas producer turbine disk assemblies 420 and power turbine disk assemblies 425 each include a turbine disk that is circumferentially populated with turbine blades. Turbine nozzles 450 axially precede each of the gas producer turbine disk assemblies 420 and power turbine disk assemblies 425. Each turbine disk assembly paired with the adjacent turbine nozzles 450 that precede the turbine disk assembly is considered a turbine stage. Turbine 400 includes multiple turbine stages.

Gas turbine engine 100 may include a single or dual shaft configuration. In the embodiment illustrated, gas turbine engine 100 includes a gas producer shaft 120 and a power turbine shaft 125. The gas producer shaft 120 mechanically couples to compressor rotor assembly 210 and to gas producer turbine disk assemblies 420. The Power turbine shaft 125 couples to power turbine disk assemblies 425. Power turbine shaft 125 may also include power output coupling 600.

The exhaust 500 includes an exhaust diffuser 520 and an exhaust collector 550.

One or more of the above components (or their subcomponents) may be made from stainless steel and/or durable, high temperature materials known as "superalloys". A superalloy, or high-performance alloy, is an alloy that exhibits excellent mechanical strength and creep resistance at high temperatures, good surface stability, and corrosion and oxidation resistance. Superalloys may include materials such as HASTELLOY, INCONEL, WASPALOY, RENE alloys, HAYNES alloys, INCOLOY, MP98T, TMS alloys, and CMSX single crystal alloys.

The gas turbine engine 100 includes a slow roll system 700. Slow roll system 700 includes a motor 710 and a variable frequency drive (VFD) 720. In some embodiments, slow roll system 700 also includes a ride thru unit (RTU) 730 and stored energy source 740. In other embodiments, RTU 730 and stored energy source 740 are separate from slow roll system 700. Motor 710 mechanically couples to gas producer shaft 120. In some embodiments, motor 710 couples to gas producer shaft 120 through a gearbox 705, as illustrated. A motor shaft 707 may connect motor 710 to gearbox 705. In other embodiments, motor 710 may couple directly to gas producer shaft 120. In embodiments with a single shaft configuration, motor 710 couples to the single shaft. Motor 710 may be the starter motor of gas turbine engine 100. VFD 720 is electrically connected to motor 710 by VFD power output 751. VFD 720 may output alternating current (AC) to motor 710 through VFD power output 751. VFD 720 is electrically connected to an AC power source such as a power grid by VFD AC input 752 and is electrically connected to RTU 730 by VFD battery input 753. The AC power source may provide three-phase AC power to the various components of gas turbine engine 100, including slow roll system 700. VFD battery input 753 may be connected to the direct current (DC) bus (not shown) of VFD 720. VFD 720 may include an AC to DC voltage converter and a DC to AC voltage converter.

RTU 730 is electrically connected to VFD 720, stored energy source 740, and to the AC power source that VFD 720 is connected to. RTU battery input 754 connects RTU 730 to stored energy source 740 and RTU AC input 755 connects RTU 730 to the AC power source.

RTU 730 may be an enclosed device configured to boost the voltage of the electricity supplied from stored energy source 740 and supply the electricity with the boosted voltage to VFD 720. RTU 730 may include one or more DC to DC voltage converters, terminal strips, and electromagnetic compatibility filters. Each DC to DC voltage converter may output 5.2 kW power and may output a maximum current of 10.2 A. In one embodiment, each DC to DC voltage converter is configured to boost 120 direct current voltage (VDC) from stored energy source 740 to either 510 VDC or 560 VDC. Each DC-DC voltage converter may include a 3-phase inverter, a high frequency transformer, and a rectifier. Other configurations and converters may also be used.

Stored energy source 740 may provide 120 VDC to RTU 730. Stored energy source 740 may be a battery or a collection/rack of batteries. In one embodiment, stored energy source 740 is sized to operate slow roll system 700 for at least four hours. In another embodiment, stored energy source 740 is sized to operate slow roll system 700 between four and five hours. Other lengths of time and capacities may be used depending on, inter alia, the size of gas turbine engine 100 and the length of gas producer shaft 120. In yet another embodiment, stored energy source 740 may be sized to operate slow roll system 700 until the shaft cools down to a predetermined temperature.

VFD power output 751. VFD AC input 752, VFD battery input 753, RTU battery input 754, and RTU AC input 755 may be electric wires/cables or other insulated conductors used to carry electricity. VFD power output 751, VFD AC input 752, and RTU AC input 755 may be configured to carry three-phase AC power.

Figure 2:
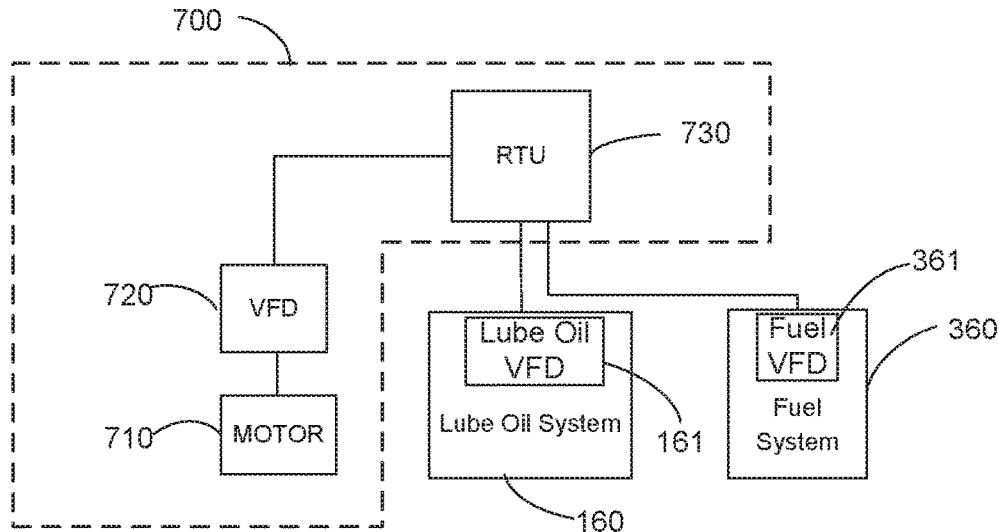
FIG. 2 is a functional block diagram including the ride thru unit of FIG. 1.

FIG. 2 is a functional block diagram including the RTU 730 of FIG. 1. In some embodiment, gas turbine engine 100 includes a lube oil system 160 and a fuel system 360. Lube oil system 160 is configured to circulate oil through the lube oil system from a lube oil tank (not shown) to bearing assemblies 150, among other things. Fuel system 360 is configured to supply fuel to fuel injectors 310. As illustrated in FIG. 2, RTU 730 may be electrically connected to VFD 720, lube oil system 160, and fuel system 360. Other RTUs may also be used.

Lube oil system 160 may include a lube oil pump and a lube oil VFD 161 electrically connected to the lube oil pump. In embodiments, lube oil VFD 161 electrically connects to RTU 730 in the same or a similar manner as VFD 720 connects to RTU 730. In other embodiments, the lube oil system 160 includes a separate lube oil RTU (not shown). Lube oil pump, lube oil VFD, and lube oil RTU are all connected in the same or a similar manner as motor 710, VFD 720, and RTU 730. Lube oil RTU may also be connected to stored energy source 740 or may be connected to a secondary stored energy source.

Fuel system 360 includes a fuel VFD 361 that may be electrically connected to a liquid fuel pump or a gas fuel compressor. In embodiments, fuel VFD 361 electrically connects to RTU 730 in the same or a similar manner as VFD 720 connects to RTU 730. In other embodiments, the fuel system 360 includes a separate fuel RTU (not shown). The fuel pump or compressor, fuel VFD, and fuel RTU may all be connected in the same or a similar manner as motor 710, VFD 720, and RTU 730. Fuel RTU may also be connected to stored energy source 740 or may be connected to a secondary or tertiary stored energy source.

Gas turbine engine 100 may include a control system including any number of controllers and modules for controlling and operating gas turbine engine 100 and the components and systems of gas turbine engine 100, such as slow roll system 700, the lube oil system, and the fuel system. The control system may include an electronic control circuit having a central processing unit (CPU), such as a processor, or micro controller. Alternatively, the control system may include programmable logic controllers or field-programmable gate arrays. The control system may also include memory for storing computer executable instructions, which may be executed by the CPU. The memory may further store data related to controlling, inter alia, slow roll system 700, the lube oil system, and the fuel system. The control system may also include inputs and outputs to receive sensor signals and send control signals.

INDUSTRIAL APPLICABILITY

Gas turbine engines may be suited for any number of industrial applications such as various aspects of the oil and gas industry (including transmission, gathering, storage, withdrawal, and lifting of oil and natural gas), the power generation industry, cogeneration, aerospace, and other transportation industries.

Referring to FIG. 1, a gas (typically air 10) enters the inlet 110 as a "working fluid", and is compressed by the compressor 200. In the compressor 200, the working fluid is compressed in an annular flow path 115 by the series of compressor disk assemblies 220. In particular, the air 10 is compressed in numbered "stages", the stages being associated with each compressor disk assembly 220. For example, "4th stage air" may be associated with the 4th compressor disk assembly 220 in the downstream or "aft" direction, going from the inlet 110 towards the exhaust 500) Likewise, each turbine disk assembly may be associated with a numbered stage.

Once compressed air 10 leaves the compressor 200, it enters the combustor 300, where it is diffused and fuel is added. Air 10 and fuel are injected into the combustion chamber 390 via fuel injector 310 and combusted. Energy is extracted from the combustion reaction via the turbine 400 by each stage of the series of turbine disk assemblies. Exhaust gas 90 may then be diffused in exhaust diffuser 520, collected and redirected. Exhaust gas 90 exits the system via an exhaust collector 550 and may be further processed (e.g., to reduce harmful emissions, and/or to recover heat from the exhaust gas 90).

After shutdown of gas turbine engine 100, the various components of gas turbine engine 100 cool down. Temperature differences at the top and bottom of gas producer shaft 120 may cause gas producer shaft 120 to warp or bow as gas producer shaft 120 cools down.

Slow roll system 700 rotates gas producer shaft 120 in a slow roll while gas producer shaft 120 cools down. The slow roll may cause gas producer shaft 120 to cool down evenly and may prevent warpage or bowing of gas producer shaft 120. In one embodiment, the slow roll is conducted for at least four hours. In another embodiment, the slow roll is conducted between four and five hours.

Motor 710 and VFD 720 may generally operate off of AC power provided from a power grid. VFDs, such as VFD 720, may not be able to withstand a power loss longer than fifteen milliseconds, in which case, the VFD may shutdown. Once the VFD shuts down it can take several minutes for the VFD to start back up. The lack of rotation of the shaft during that time may allow the warpage or bowing described above to occur. A separate backup system to rotate the shaft with a turning gear assembly may be expensive and may add complexity to gas turbine engine 100. Use of VFD 720 and motor 710 throughout the slow roll operation may facilitate tailoring the slow roll to control the roll profile using RTU 730.

Figure 3:
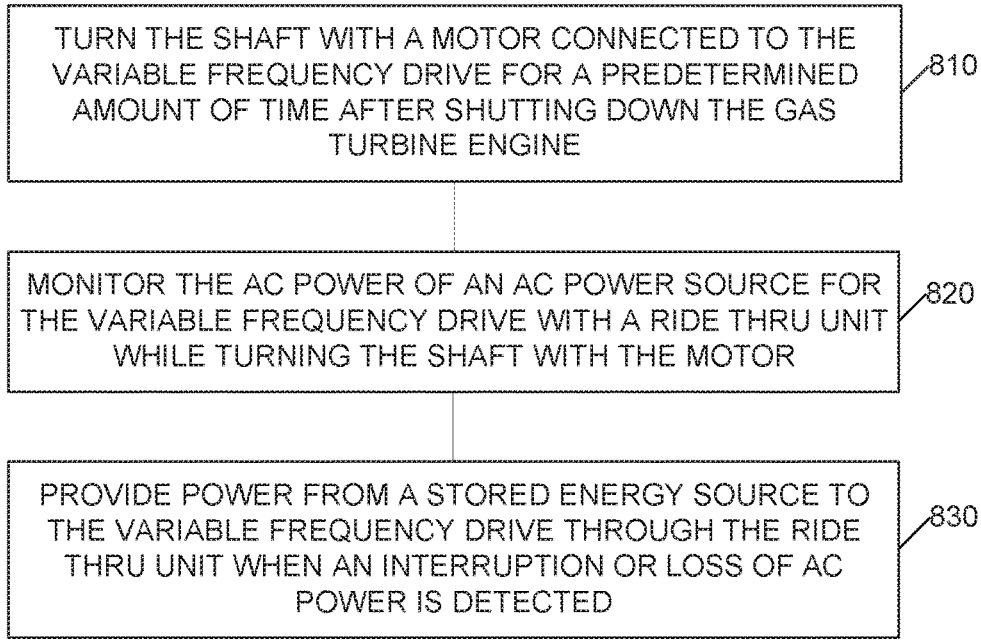
FIG. 3 is a flowchart of a method for cooling down a shaft for the gas turbine engine of FIG. 1 with a slow roll.

FIG. 3 is a flowchart of a method for cooling down a shaft for gas turbine engine 100 of FIG. 1 with a slow roll. The method includes turning the shaft with a motor 710 connected to a VFD 720 for a predetermined amount of time after shutting down the gas turbine engine 100 at step 810. In a dual shaft configuration, the shaft may be gas producer shaft 120. In one embodiment, the shaft is turned with motor 710 for at least four hours. In another embodiment the shaft is turned with motor 710 between four to five hours. Step 810 may include controlling, changing, and modifying the speed of the shaft with VFD 720. Controlling the speed of the shaft with VFD 720 may provide flexibility and may allow for optimization of the slow roll process including tailoring the slow roll to ramp the speed of the shaft up or down to maximize cooling or to reduce the cooling time.

The method also includes monitoring the AC power of an AC power source of the VFD 720 with an RTU 730 while turning the shaft with the motor 710 at step 820. The method further includes providing power from a stored energy source 740 to the VFD 720 through the RTU 730 when an interruption or loss of AC power occurs or is detected at step 830. RTU 730 may provide the power to the DC bus of VFD 720.

Stored energy source 740 may provide 120 VDC to RTU 730. RTU 730 may convert the 120 VDC to 510 VDC while the AC power is active or detected, which may be less than the voltage on the DC bus of VFD 720, and may convert the 120 VDC to 560 VDC while the AC power is lost or not detected so that VFD 720 can continue to operate without the AC power. Providing power to the VFD 720 from the stored energy source 740 may be performed in less than fifteen milliseconds in some embodiments. In some embodiments, stored energy source 740 is at least one battery. In other embodiments, stored energy source 740 is an array of batteries.

Other components and systems, such as lube oil system 160 and fuel system 360 of gas turbine engine 100 use VFDs and motors/pumps/compressors during operation of gas turbine engine 100. A loss in power to the lube oil VFD or the fuel VFD may require a complete shutdown of gas turbine engine 100. Such shutdowns may cause extended interruptions in the operation of gas turbine engine 100 and may negatively impact operator's processes.

Use of RTU 730 or a separate RTU for lube oil system 160 and fuel system 360 may prevent or reduce shutdown of gas turbine engine 100 in the event of a temporary or brief loss in AC power. For example, when a loss of AC power occurs or is detected, RTU 730 or a second RTU may provide power from stored energy source 740 to the lube oil VFD to maintain operation of the lube oil pump and the lube oil system 160. Similarly, when a loss of AC power occurs or is detected, RTU 730, a second RTU, or a third RTU may provide power from stored energy source 740 to the fuel VFD to maintain operation of the fuel pump or compressor, and the fuel system 360.

The control system may include a slow roll module, a lube oil module, and a fuel module. The slow roll module is configured to turn the shaft with motor 710 connected to VFD 720 for a predetermined amount of time after shutting down gas turbine engine 100. Either the slow roll module or RTU 730 may be configured to monitor the AC power of an AC power source for gas turbine engine 100 and provide power from stored energy source 740 to VFD 720 through RTU 730 when an interruption or loss of AC power occurs or is detected. The slow roll module may be configured to control, change, and modify the speed of the shaft using VFD 720.

The lube oil module is configured to regulate the speed of lube oil pump. Either lube oil module, RTU 730, or a lube oil RTU may be configured to monitor an AC power of an AC power source for gas turbine engine 100 and provide power from a stored energy source to lube oil VFD through either RTU 730 or lube oil RTU up to a predetermined amount of time when an interruption or loss of AC power occurs or is detected, and shut down gas turbine engine 100 when the interruption or loss of AC power lasts longer than the predetermined amount of time. The predetermined amount of time may depend on the size and uses of the stored energy source. In one embodiment, the predetermined amount of time is between ten to twenty seconds. In another embodiment, the predetermined amount of time is ten seconds.

The fuel module is configured to regulate the amount of fuel supplied to fuel injectors 310 through a liquid fuel pump, gas fuel compressor or by other means. Either fuel module, RTU 730 or fuel RTU may be configured to monitor an AC power of an AC power source for gas turbine engine 100, provide power from a stored energy source to fuel VFD through RTU 730 or the fuel RTU up to a predetermined amount of time when an interruption or loss of AC power occurs or is detected, and shut down gas turbine engine 100 when the interruption or loss of AC power lasts longer than the predetermined amount of time. The predetermined amount of time may depend on the size and uses of the stored energy source. In one embodiment, the predetermined amount of time is between three to ten seconds. In another embodiment, the predetermined amount of time is three seconds.

The preceding detailed description is merely exemplary in nature and is not intended to limit the invention or the application and uses of the invention. The described embodiments are not limited to use in conjunction with a particular type of gas turbine engine. It will be appreciated that the gas turbine engine in accordance with this disclosure can be implemented in various other configurations. Furthermore, there is no intention to be bound by any theory presented in the preceding background or detailed description. It is also understood that the illustrations may include exaggerated dimensions to better illustrate the referenced items shown, and are not consider limiting unless expressly stated as such.

What is claimed is:

1. A gas turbine engine, comprising:
   a compressor including
      a compressor rotor assembly including a plurality of compressor disk assemblies;
   a combustor adjacent the compressor;
   a turbine adjacent the combustor, the turbine including
      a turbine rotor assembly including
         a plurality of turbine disk assemblies;
   a shaft coupled to the compressor rotor assembly and at least one turbine disk assembly;
   a motor coupled to the shaft;
   a variable frequency drive electrically connected to the motor and to an AC power source and configured to slow roll the gas turbine engine at shutdown, the variable frequency drive including an AC to DC voltage converter and a DC to AC voltage converter;
   a stored energy source; and
   a ride thru unit electrically connected to the variable frequency drive, the AC power source and the stored energy source, the ride thru unit including at least one DC to DC voltage converter, operable to monitor an AC power of the AC power source, and provide power from the stored energy source to the variable frequency drive through the ride thru unit when an interruption or loss of the AC power is detected while the shaft is turned with the motor for a predetermined amount of time after shutdown of the gas turbine engine; and
   a lube oil system including
      a lube oil variable frequency drive;
   wherein the lube oil variable frequency drive is electrically connected to the ride thru unit and the ride thru unit is further configured to provide power from the stored energy source to the lube oil variable frequency drive through the ride thru unit up to a second predetermined amount of time when an interruption or loss of the AC power is detected during operation of the gas turbine engine, and shut down the gas turbine engine when the interruption or loss of the AC power lasts longer than the second predetermined amount of time.

2. The gas turbine engine of claim 1, wherein the at least one DC to DC voltage converter is configured to convert the power from the stored energy source to 510 VDC when the AC power is detected and convert the power from the stored energy source to 560 VDC when the AC power is not detected.

3. The gas turbine engine of claim 1, wherein the predetermined amount of time is from four to five hours.

4. The gas turbine engine of claim 1, wherein the predetermined amount of time is four hours.

5. The gas turbine engine of claim 1, wherein the stored energy source includes a battery.

6. The gas turbine engine of claim 1, wherein the ride thru unit is electrically connected to a DC bus of the variable frequency drive.

7. The gas turbine engine of claim 1, wherein the second predetermined amount of time is between ten and twenty seconds.

8. The gas turbine engine of claim 1, wherein the gas turbine engine includes a dual shaft configuration including the shaft and a power turbine shaft, wherein the shaft is a gas producer shaft.

9. A gas turbine engine, comprising:
   a compressor including
      a compressor rotor assembly including a plurality of compressor disk assemblies;
   a combustor adjacent the compressor;
   a turbine adjacent the combustor, the turbine including
      a turbine rotor assembly including
         a plurality of turbine disk assemblies;
   a shaft coupled to the compressor rotor assembly and at least one turbine disk assembly;
   a motor coupled to the shaft;
   a variable frequency drive electrically connected to the motor and to an AC power source and configured to slow roll the gas turbine engine at shutdown, the variable frequency drive including an AC to DC voltage converter and a DC to AC voltage converter;
   a stored energy source; and
   a ride thru unit electrically connected to the variable frequency drive, the AC power source and the stored energy source, the ride thru unit including at least one DC to DC voltage converter, operable to monitor an AC power of the AC power source, and provide power from the stored energy source to the variable frequency drive through the ride thru unit when an interruption or loss of the AC power is detected while the shaft is turned with the motor for a predetermined amount of time after shutdown of the gas turbine engine; and a fuel variable frequency drive;

wherein the fuel variable frequency drive is electrically connected to the ride thru unit and the ride thru unit is further configured to provide power from the stored energy source to the fuel variable frequency drive through the ride thru unit up to a second predetermined amount of time when an interruption or loss of the AC power is detected during operation of the gas turbine engine, and shut down the gas turbine engine when the interruption or loss of the AC power lasts longer than the second predetermined amount of time.

10. The gas turbine engine of claim 9, wherein the second predetermined amount of time is between three and ten seconds.

11. A gas turbine engine, comprising:
a compressor including
a compressor rotor assembly including a plurality of compressor disk assemblies;
a combustor adjacent the compressor;
a turbine adjacent the combustor, the turbine including
a turbine rotor assembly including
a plurality of turbine disk assemblies;
a shaft coupled to the compressor rotor assembly and at least one turbine disk assembly;
a starter motor coupled to the shaft configured to rotate the shaft after shutdown of the gas turbine engine;
a variable frequency drive electrically connected to the starter motor and to an alternating current power source;
a stored energy source including a battery; and
a ride thru unit electrically connected to the variable frequency drive, the stored energy source, and the alternating current power source, the ride thru unit configured to supply DC power to the variable frequency drive from the stored energy source when a loss in the alternating current power supplied to the variable frequency drive occurs while the starter motor rotates the shaft after shutdown of the gas turbine engine; and
a lube oil system including
a lube oil variable frequency drive;
wherein the lube oil variable frequency drive is electrically connected to the ride thru unit and the ride thru unit is further configured to provide power from the stored energy source to the lube oil variable frequency drive through the ride thru unit up to a second predetermined amount of time when an interruption or loss of the AC power is detected during operation of the gas turbine engine, and shut down the gas turbine engine when the interruption or loss of the AC power lasts longer than the second predetermined amount of time.

12. The gas turbine engine of claim 11, further comprising:
a fuel variable frequency drive;
wherein the fuel variable frequency drive is electrically connected to the ride thru unit and the ride thru unit is further configured to provide power from the stored energy source to the fuel variable frequency drive through the ride thru unit up to a second predetermined amount of time when an interruption or loss of the AC power is detected during operation of the gas turbine engine, and shut down the gas turbine engine when the interruption or loss of the AC power lasts longer than the second predetermined amount of time.

13. The gas turbine engine of claim 9, wherein the at least one DC to DC voltage converter is configured to convert the power from the stored energy source to 510 VDC when the AC power is detected and convert the power from the stored energy source to 560 VDC when the AC power is not detected.

14. The gas turbine engine of claim 9, wherein the predetermined amount of time is from four to five hours.

15. The gas turbine engine of claim 9, wherein the predetermined amount of time is four hours.

16. The gas turbine engine of claim 11, wherein the at least one DC to DC voltage converter is configured to convert the power from the stored energy source to 510 VDC when the AC power is detected and convert the power from the stored energy source to 560 VDC when the AC power is not detected.

17. The gas turbine engine of claim 11, wherein the predetermined amount of time is from four to five hours.

18. The gas turbine engine of claim 11, wherein the predetermined amount of time is four hours.

19. The gas turbine engine of claim 1, wherein the gas turbine engine includes a dual shaft configuration including the shaft and a power turbine shaft, wherein the shaft is a gas producer shaft.

20. The gas turbine engine of claim 11, wherein the gas turbine engine includes a dual shaft configuration including the shaft and a power turbine shaft, wherein the shaft is a gas producer shaft.

* * * * *